(12) United States Patent
Devisme et al.

(10) Patent No.: US 8,765,869 B2
(45) Date of Patent: Jul. 1, 2014

(54) OLEFIN POLYMERS HAVING ASSOCIATIVE GROUPS, AND ADHESIVES CONTAINING SAME

(75) Inventors: Samuel Devisme, Rouen (FR); Nicolas Dufaure, Bernay (FR); Christian Laurichesse, Lons (FR); Manuel Hidalgo, Brignais (FR)

(73) Assignee: Arkema France, Colombes Cedex (FR)

( * ) Notice: Subject to any disclaimer, the term of this patent is extended or adjusted under 35 U.S.C. 154(b) by 136 days.

(21) Appl. No.: 13/383,442

(22) PCT Filed: Jul. 22, 2010

(86) PCT No.: PCT/FR2010/051549
§ 371 (c)(1),
(2), (4) Date: Jan. 27, 2012

(87) PCT Pub. No.: WO2011/012799
PCT Pub. Date: Feb. 3, 2011

(65) Prior Publication Data
US 2012/0116010 A1 May 10, 2012

(30) Foreign Application Priority Data

Jul. 28, 2009 (FR) ..................................... 09 55270
Mar. 26, 2010 (FR) ..................................... 10 52217

(51) Int. Cl.
  C09J 123/02 (2006.01)
  C08F 2/01 (2006.01)
  C08F 210/02 (2006.01)
  C09J 133/12 (2006.01)
  C08F 220/36 (2006.01)
  C09J 131/04 (2006.01)
  C08F 218/08 (2006.01)
  C08F 226/06 (2006.01)
  C08F 212/08 (2006.01)

(52) U.S. Cl.
  CPC ............. *C08F 210/02* (2013.01); *C09J 133/12* (2013.01); *C08F 220/36* (2013.01); *C09J 131/04* (2013.01); *C08F 218/08* (2013.01); *C09J 2201/61* (2013.01); *C08F 212/08* (2013.01); *C08F 226/06* (2013.01)
  USPC ................ 524/548; 526/263; 526/64; 525/55

(58) Field of Classification Search
  CPC .......... C09J 123/02; C08F 2/01; C08F 210/02
  USPC ........................ 524/548; 526/263, 64; 525/55
  See application file for complete search history.

(56) References Cited

U.S. PATENT DOCUMENTS

| 4,423,182 | A  | * | 12/1983 | Bartman ........................ 524/367 |
| 4,701,509 | A  | * | 10/1987 | Sun et al. ...................... 526/264 |
| 5,747,616 | A  | * | 5/1998 | Muller et al. .................. 526/262 |
| 2005/0176876 | A1 | * | 8/2005 | Lee ............................... 524/556 |
| 2008/0221272 | A1 | * | 9/2008 | Tournilhac et al. ............ 525/194 |
| 2010/0135940 | A1 | * | 6/2010 | Grimaldi et al. ................ 424/62 |
| 2010/0219371 | A1 | * | 9/2010 | Paul ........................ 252/182.29 |

FOREIGN PATENT DOCUMENTS

| DE | 4341528 A1 | 6/1995 |
| DE | 102005117158 A1 | 8/2006 |
| EP | 0175562 A2 | 3/1986 |
| FR | 2896499 A1 | 7/2007 |

OTHER PUBLICATIONS

International Search Report received in PCT/FR2010/051549, mailed Oct. 4, 2010.

* cited by examiner

*Primary Examiner* — Michael M Bernshteyn
(74) *Attorney, Agent, or Firm* — Smith, Gambrell & Russell, LLP

(57) ABSTRACT

The present invention relates to olefin polymers having associative groups containing nitrogen heterocyclic compounds, to hot-melt adhesives including such polymers, and to method for producing same. Specifically, the invention relates to a polymer comprising units from ethylene and from a monomer having associative groups, said monomer including a polymerizing reactive group and an associative group containing nitrogen heterocyclic compounds.

13 Claims, No Drawings

OLEFIN POLYMERS HAVING ASSOCIATIVE GROUPS, AND ADHESIVES CONTAINING SAME

This application is a 371 National Phase entry of PCT/FR2010/051549, filed 22 Jul. 2010, and claims the benefit of FR 0955270, filed 28 Jul. 2009, and FR 1052217, filed 26 Mar. 2010, All which are herein incorporated by reference in their entirety.

The present invention relates to olefinic polymers carrying associative groups based on nitrogenous heterocycles, to hot-melt adhesives comprising such polymers and to their processes of preparation.

Hot-melt adhesives are thermoplastic materials which are solid at ambient temperature and which become viscous liquids when heated. These viscous liquids are applied to a first substrate which is covered with a second surface. On cooling, adhesion is obtained between the substrate and the second surface, by virtue of the adhesive layer present between the two. The open assembly time is the period during which the adhesive which has been applied to a substrate, which is generally at ambient temperature, remains tacky, that is to say the interval of time during which it is possible to apply the second surface and, by cooling, to obtain adhesion between the substrate and the second surface. Once this time limit for the open assembly time has been exceeded, it is no longer possible to obtain sufficient adhesion between the substrate and the second surface. The setting time is the minimum time necessary in order for the adhesive joint to provide the assembly with cohesion.

These adhesives are denoted by the abbreviation HMA (hot-melt adhesives). The present invention relates to adhesives of this type. These hot-melt adhesive compositions generally comprise two main constituents: a thermoplastic polymer (responsible for the good mechanical and thermal properties and for at least a portion of the adhesive properties) and a tackifying resin which plays a part in improving the hot tack, the flowability or the wettability. Generally, a number of additives are added thereto, such as plasticizers, including oils, or waxes, stabilizers or fillers. Waxes (for example paraffin waxes) make it possible to adjust the flowability, the open assembly time and the setting time. Mention may be made, among the most widely used thermoplastic polymers, of ethylene/vinyl acetate, ethylene/alkyl(meth)acrylate, or styrene/butadiene/styrene copolymers, atactic poly-α-olefin (APAO), thermoplastic rubber, polyamide and others. Tackifying resins belong chiefly to three main families: rosins (and their derivatives), terpene resins and petroleum-derived resins (aliphatic resins, aromatic resins and the like).

The inventors have shown that the use of an olefinic polymer carrying associative groups based on nitrogenous heterocycle makes it possible in particular to improve the hot adhesion between two supports.

In particular, the inventors have shown that a specific polymer comprising units resulting from the copolymerization between ethylene and at least one unsaturated ethylenic monomer carrying associative groups based on nitrogenous heterocycles makes it possible to improve the adhesion between an aluminum sheet and a glass sheet, in comparison with the same polymers not carrying associative groups. The inventors have also discovered that the use of this type of polymer also makes it possible to reduce the setting time and to increase the open assembly time for use of the adhesives defined above.

The inventors have shown that such a polymer also makes it possible to improve the bonding time of a hot-melt adhesive comprising said polymer, in addition to making possible improved adhesion. This polymer thus makes it possible to reduce the amount of tackifying resin to be added in order to obtain a level of adhesion equivalent of that of a normal adhesive. These associative groups also confer excellent mechanical strength on the polymer, in particular an increase in the creep strength at high temperature, particularly at temperatures close to or greater than the melting point of the polymer. This property is particularly advantageous in applications where an improved resistance to temperature is required. For example, this polymer can be used as sealing layer in the protective covers used in food packagings (containers, cartons, and the like) subjected to a heat treatment at an intermediate temperature, such as pasteurization. This improved creep strength also makes it possible to improve the properties of strength of the hot weld or hot tack of a multilayer structure. This creep strength makes it possible to use such polymers in form fill seal applications in which the welds are highly stressed under hot conditions because of the high throughputs but also in hot filling processes.

A subject matter of the invention is thus a polymer comprising units resulting from ethylene and a monomer carrying associative groups, said monomer carrying associative groups comprising:

(i) a reactive group capable of polymerizing which comprises an ethylenic functional group, which reactive group is preferably chosen from a (meth)acrylate, N-monosubstituted (meth) acrylamide, N,N-disubstituted (meth)acrylamide, vinyl, allyl or styryl group; and (ii) an associative group comprising a nitrogenous heterocycle.

Within the meaning of the present invention, the term "polymer" is understood to mean a copolymer comprising monomer units of at least two types. The term "polymer" according to the invention also includes the copolymers which can comprise units of three or more different types. The term "polymer" used in the present description thus includes, in particular copolymers and terpolymers.

The reactive groups capable of polymerizing or polymerizable functional groups, on the one hand and the associative groups on the other hand, of the associative monomer can be separated by a rigid or flexible alkylene chain composed of from 1 to 30 carbon atoms, some at least of which can be substituted, and optionally of one or more heteroatoms, chosen in particular from sulfur, oxygen and nitrogen, said chain optionally including one or more ester or amide bridges. It is preferably a linear or branched $C_1$-$C_{24}$, preferably $C_1$-$C_{10}$, alkylene chain optionally interrupted by one or more nitrogen atoms, more preferably a linear $C_1$-$C_6$ alkylene chain.

Said rigid or flexible chain does not comprise an isocyanate functional group.

The term "associative groups" is understood to mean groups capable of associating with one another via hydrogen, ionic and/or hydrophobic bonds. According to a preferred form of the invention, the groups are ones capable of associating via hydrogen bonds, comprising a nitrogenous heterocycle, generally having 5 or 6 atoms, preferably a dinitrogenous heterocycle, and comprising a carbonyl functional group. Examples of associative groups which can be used according to this preferred form of the invention are imidazolidonyl, triazolyl, triazinyl, bis-ureyl or ureido-pyrimidyl groups. The imidazolidonyl group is preferred.

The reactive group capable of polymerizing is preferably a (meth)acrylate or (meth)acrylamide group. Other ethylenic functional groups which are reactive in polymerization could also be envisaged, for example vinyl groups or functional groups.

The monomer carrying associative groups can thus correspond to the formula (I):

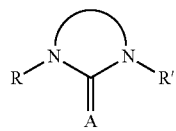
(1)

where:
R- denotes a group of formula T-(G)$_n$- in which T is a reactive group capable of polymerizing which comprises an ethylenic functional group, preferably chosen from a (meth) acrylate, N-monosubstituted (meth)acrylamide, N,N-disubstituted (meth)acrylamide, vinyl, allyl or styryl group, n has the value 0 or 1 and G is a linear or branched $C_1$-$C_{24}$, preferably $C_1$-$C_{10}$, alkylene chain optionally interrupted by one or more nitrogen atoms, more preferably a linear $C_1$-$C_6$ alkylene chain,
R' denotes a hydrogen atom,
A denotes an oxygen or sulfur atom, preferably an oxygen atom.

Preferred examples of monomers carrying associative groups are ethylimidazolidone methacrylate and ethylimidazolidone methacrylamide.

Ethylimidazolidone methacrylate can be prepared according to the process described in the application EP 0 829 475.

Ethylimidazolidone methacrylamide can be prepared according to the process described in the application U.S. Pat. No. 2,727,016.

Preferably, said monomer carrying associative groups does not comprise an isocyanate functional group and entirely preferably said monomer carrying associative groups is composed solely of a reactive group as defined above and of a nitrogenous heterocycle.

The polymers according to the invention can comprise other monomers in addition to the ethylene and associative monomers defined above. These monomers are denoted in the present description as "other monomers", that is to say monomers not comprising ethylene or associative groups. The monomers concerned may, for example, be:
an unsaturated carboxylic acid, such as acrylic acid or methacrylic acid. The amount of unsaturated carboxylic acid is generally less than 50% of the total weight of the polymer and can be within the range extending from 5 to 40%;
an unsaturated carboxylic acid ester, such as alkyl acrylates or alkyl methacrylates. The alkyl chains of these (meth) acrylates are linear or branched and can have up to 30 carbon atoms, for example from 1 to 10 carbon atoms. Mention may be made, as alkyl chains, of methyl, ethyl, propyl, n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl or nonacosyl. Preference is given to methyl, ethyl, n-butyl and 2-ethylhexyl (meth)acrylates as unsaturated carboxylic acid esters. The amount of unsaturated carboxylic acid ester is generally less than 50% of the total weight of the polymer and can be within the range extending from 5 to 40%;
a carboxylic acid vinyl ester preferably comprising from 4 to 40 carbon atoms, for example from 4 to 10 carbon atoms. Mention may be made, as examples of carboxylic acid vinyl esters, of vinyl acetate, vinyl versatate, vinyl propionate, vinyl butyrate or vinyl maleate. Preference is given to vinyl acetate as carboxylic acid vinyl ester. The amount of carboxylic acid vinyl ester is generally less than 50% of the total weight of the polymer and can be included within the range extending from 5 to 40%;
an α-olefin, the latter being other than ethylene, preferably comprising from 3 to 50 carbon atoms, more preferably from 4 to 20 carbon atoms, very preferably from 6 to 10 carbon atoms. Mention may be made, as an example of α-olefin, of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. The amount of α-olefin is generally less than 10% of the total weight of the polymer and can be within the range extending from 0.1 to 5%;
a diene, preferably comprising from 3 to 50 carbon atoms and more preferably from 3 to 20 carbon atoms. Mention may be made, as an example of diene, of butadiene or ethylidenenorbornene. The amount of diene is generally less than 10% of the total weight of the polymer and can be within the range extending from 0.1 to 5%;
an unsaturated carboxylic acid anhydride preferably comprising from 4 to 30 carbon atoms. Mention may be made, as unsaturated carboxylic acid anhydride, of maleic anhydride, itaconic anhydride, citraconic anhydride or tetrahydrophthalic anhydride. Preference is given to maleic anhydride as unsaturated carboxylic acid anhydride. The amount of an unsaturated carboxylic acid anhydride is generally less than 10% of the total weight of the polymer and can be within the range extending from 0.1 to 5%;
an unsaturated epoxide, preferably comprising from 4 to 30 carbon atoms. They may be aliphatic glycidyl esters or ethers, such as allyl glycidyl ether, vinyl glycidyl ether, glycidyl maleate, glycidyl itaconate, glycidyl acrylate and glycidyl methacrylate. They may also be alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 5-norbornene-2-methyl-2-carboxylate and diglycidyl endo-cis-bicyclo[2.2.1]hept-5-ene-2,3-dicarboxylate. Preference is given to glycidyl methacrylate as unsaturated epoxide. The amount of unsaturated epoxide is generally less than 10% of the total weight of the polymer and can be within the range extending from 0.1 to 5%.

According to a preferred alternative form of the invention, the polymer comprises other monomers chosen from carboxylic acid vinyl esters or unsaturated carboxylic acid esters. According to this alternative form the polymer, which is the subject matter of the invention can be a polymer resulting from the polymerization of monomers comprising:
ethylene;
associative monomer, preferably ethylimidazolidone methacrylate or ethylimidazolidone methacrylamide; and
at least one other monomer chosen from vinyl acetate, methyl(meth)acrylate, ethyl (meth)acrylate, n-butyl (meth)acrylate and 2-ethylhexyl(meth)acrylate.

The polymer which is the subject matter of the invention can be a polymer resulting from the polymerization of monomers comprising, by weight with respect to the total weight of the polymer:

from 35 to 99.98% of ethylene, preferably from 55 to 89.9%;

from 0.01 to 20% of at least one associative monomer, preferably from 0.1 to 10%;

from 0.01 to 50% of at least one other monomer which is not an associative monomer or ethylene, preferably from 10 to 40%.

Preferably, said other monomer is chosen from unsaturated carboxylic acid esters and unsaturated carboxylic acid vinyl esters and their mixtures.

The amounts of the various monomers present in the copolymer can be measured by infrared spectroscopy using the standard ISO 8985 (1998).

According to the invention, in order to obtain the polymer comprising associative groups, said monomers carrying associative groups are introduced during the polymerization, as a mixture with the ethylene and optionally the other monomers used to construct the polymer. Thus, the monomers carrying associative groups are inserted into the actual backbone of the polymer chains while carrying said associative groups based on a nitrogenous heterocycle.

The polymer which is the subject matter of the invention can thus be obtained by polymerization according to a novel process carried out under pressure, as indicated below.

The polymers are prepared by a high-pressure radical polymerization process. The polymerization can be carried out, for example, in a stirred autoclave or tubular reactor.

The pressure inside the reactor is generally between 1000 and 3000 bar, preferably between 1500 and 2500 bar. The temperature during the initiation of the reaction is generally between 100 and 300° C., advantageously between 100 and 170° C. The maximum reaction temperature is between 180 and 300° C. and preferably between 180 and 260° C.

The copolymerization is generally carried out by introducing the ethylene, the associative monomer and optionally the other monomers and a polymerization initiator at high pressure into an autoclave or tubular reactor at a temperature of between 100° C. and 150° C., the amount of the comonomers carrying associative groups preferably ranging up to 20% by weight, with respect to the total amount of the monomers (ethylene and other comonomers) introduced into the reactor. When a tubular reactor is used, preferably, the mixture of ethylene, monomers and polymerization initiator is introduced at the inlet of the tubular reactor and optionally at least one other injection point situated along the tubular reactor; reference is then made to multipoint injection technique.

Use may also be made, with the monomers and the initiator, of a transfer agent in molar proportions of less than 1%. These transfer agents, which make it possible to control the molecular weights, are generally aliphatic aldehydes or ketones; mention may be made, for example, of propionaldehyde or MEK (Methyl Ethyl Ketone).

The amount of initiator varies between 10 and 1000 ppm, with respect to the monomers introduced.

Use may be made as polymerization initiator, of any organic or inorganic compounds which releases free radicals under the reaction conditions; use will preferably be made of mixtures of compounds comprising a peroxide group. Mention may be made, among the families of peroxides used, for example, of: peroxyesters, diacyls, percarbonates, peroxyketals, dialkyls and hydroperoxides.

Well suited peroxides are, for example, tert-butyl peroxyneodecanoate, tert-butyl peroxy-2-ethylhexanoate, tert-butyl peroxy-3,5,5-trimethylhexanoate, tert-butyl peroxypivalate or di(tert)-butyl peroxide.

Thus, another subject matter of the invention is a process for the preparation of polymers as defined above by high-pressure radical copolymerization carried out by introducing ethylene, a monomer carrying associative groups, optionally one or more other monomers, a polymerization initiator and optionally a transfer agent into a tubular reactor at a pressure of between 1000 and 3000 bar, at a temperature of between and 325° C., the amount of monomers carrying associative groups which are introduced ranging up to 20% by weight, with respect to the total weight of the mixture of ethylene and monomers carrying associative groups which are introduced.

The number of associative groups carried by the polymer in this embodiment according to the invention can be adjusted simply by varying the amount of monomer carrying associative groups or the reaction time and temperature. It is generally preferable for the amount of associative monomer to represent from 0.1 to 20% by weight, preferably from 0.2 to 15% by weight and preferably from 0.2 to 10% by weight, with respect to the weight of the polymer, and/or for the mean number of associative groups per polymer chain to be between 1 and 200, preferably between 1 and 100 and entirely preferably between 1 and 50 or between 1 and 30.

It has been demonstrated that the polymer which is the subject matter of the invention makes it possible to improve the adhesion between two supports, in comparison with the same polymers not carrying associative groups. The inventors have shown that such a polymer also makes it possible to improve the bonding time of a hot-melt adhesive comprising it.

Another subject matter of the present invention is thus the use of a polymer comprising associative monomers as described above for improving the cohesive and adhesive behavior as a function of the temperature of adhesive compositions of which it may form part.

Another subject matter of the invention is a hot-melt adhesive comprising a polymer as defined above and also the use of a polymer as defined above in the manufacture of a hot-melt adhesive.

Preferably, the hot-melt adhesives comprising the polymer of the invention additionally comprise at least one tackifying resin.

These adhesives are generally deposited under hot conditions on a substrate.

Tackifying resins which are suitable are, for example, rosin, rosin esters, hydrogenated rosin, polyterpenes and derivatives, aromatic or aliphatic petroleum resins, or hydrogenated cyclic resins. These resins typically have a ring-and-ball softening temperature of between 25° C. and 180° C. and preferably between 50° C. and 135° C.

Other examples of rosin derivatives are described in Ullman's Vol. A 23, pp. 79-86.

Mention may be made, as rosin derivatives, of those obtained by hydrogenation, dehydrogenation, polymerization or esterification. These derivatives can be used as is or in the form of polyol esters, such as pentaerythritol, polyethylene glycol and glycerol esters.

Mention may also be made, as tackifying resin, of dicyclopentadienes.

The presence of polymer carrying associative groups in the adhesive which is the subject matter of the invention, makes it possible to improve the adhesion on various substrates (glass, metal, paper, polymer film (polyester)).

Thus, in a preferred embodiment of the invention, the adhesive comprises from 1 to 70 parts of tackifying resin per 100 parts of the mixture of polymer and resin and preferably from 20 to 50 parts of resin per 100 parts of the mixture of polymer and resin.

The adhesives which are subject matters of the invention can additionally comprise one or more plasticizers as additive.

The plasticizers which can be used in the adhesives of the invention are, for example, paraffinic, aromatic or naphthenic mineral oils. They are used essentially to lower the viscosity and to contribute tack. The amount of plasticizer can be between 10 and 30 parts per 100 parts of the mixture of adhesive.

Mention may also be made, as plasticizers, of phthalates, azelates, adipates, tricresyl phosphate and polyesters.

The adhesives of the invention can also comprise fillers and stabilizers as additives.

Mention may be made, as example of fillers, of silica, alumina, glass, glass beads, calcium carbonates, fibers and metal hydroxides. These fillers must not be so much as to reduce the tack or the mechanical or adhesive properties of the adhesive after the application thereof. The amount of fillers can represent up to 100 parts per 100 parts of adhesive.

It is recommended to add stabilizers, such as antioxidants; use may be made of the normal antioxidants for thermoplastics.

The adhesives of the invention are prepared by melt blending at temperatures of between 120° C. and 200° C. until a homogeneous mixture is obtained. The mixing time can be of the order of from 30 minutes to 3 hours. Use may be made of the normal devices for the processing of thermoplastics such as internal mixers, extruders or rolls. Use may also be made of heated and suitably stirred vessels when the flowability in the molten state of the adhesive formulations allows it.

It has been demonstrated that the polymer which is the subject matter of the invention makes it possible to improve the hot adhesion between two supports.

Thus, a polymer carrying associative groups as described above can be used to improve the adhesion and/or the shaping of the adhesive; in other words, a bonding is obtained with a shorter setting time for the same effectiveness and an ease of application (better wettability on glass, gel appearance which promotes the deposition on the substrate during coating (fewer material filaments)) is obtained which makes it possible to reduce the amount of tackifying resin to be used in order to have the desired properties.

The addition of these associative groups can also make it possible to improve the cohesion of the adhesives and to render the layer of adhesive stronger, for example by limiting the tearing when a stress is applied. Unlike the known crosslinked adhesives, the adhesive which is a subject matter of the present invention can be reshaped at high temperature by virtue of its thermally reversible bonds. These associative groups can also confer, on the adhesive, a better resistance to solvents.

Another subject matter of the present invention is the use of an adhesive as described above in the manufacture of labels or of adhesives for binding two sheets or layers of paper together or else one sheet or layer of paper with another object, such as a bag made of plastic or of plastic-coated paper, of structural or repairing hot-melt adhesives which can be used in the construction industry, do-it-yourself, the manufacture of objects, including hygiene articles, such as disposable diapers or towels, also including constituent parts of vehicles, boats or airplanes, also including articles of clothing or decoration, such as shoes, clothes, furniture and decorative objects, including office automation articles, such as paper carriers or lamps, and also any other application requiring the assembly of two surfaces without the use of a liquid vehicle (water or solvent). It will also be possible, by virtue of the hot-melt adhesives of the invention carrying associative groups, to produce bondings on difficult supports, such as board and/or floor coverings.

Another subject matter of the present invention is the use of an adhesive as described above for joining or adhesively bonding to one another materials, for example in the form of sheets, of identical or different chemical nature chosen from plastics, in particular based on polyethylene terephthalate (PET) and other polyesters, on polypropylene, on polyethylene, on PVC, on ABS, on PMMA or on polycarbonate, from wood, from elastomers, from textiles, from paper, from board, from glass and from metal, for example aluminum.

More generally, the polymer which is a subject matter of the invention can be used in all the normal applications of functional polyolefins.

A better understanding of the invention will be obtained in the light of the following examples, given solely for the purposes of illustration and which do not have the aim of restricting the scope of the invention defined by the appended claims.

EXAMPLE 1

Preparation of a Polymer According to the Invention

The polymers are prepared by a high-pressure radical polymerization process in a 233 cm$^3$ tubular reactor. Ethylene, vinyl acetate (referred to as VA) and monomers chosen from Norsocryl® 104 (50% by weight mixture of ethylimidazolidone methacrylate, referred to as EIOM, and methyl methacrylate), Norsocryl® 105 (mixture comprising 40% by weight of EIOM and 60% of 2-ethylhexyl acrylate, referred to as 2EHA) and methyl methacrylate (referred to as MMA) (the various compositions of the polymers obtained are shown in the table below) are introduced into the reactor in the presence of a polymerization initiator, which is a Luperox® 10/Luperox® 26/Luperox® 270 mixture in the proportions of 88/32/12 (% by weight), and 3000 ppm of a transfer agent (propanal). The pressure is set at 2000 bar and the starting temperature at 135° C.

The products with the Norsocryl and Luperox trade names can be obtained from Arkema.

The products obtained exhibit the following characteristics, collated in table 1.

TABLE 1

| Test ref. | VA | EIOM | MMA | 2EHA | Peroxide injected ppm weight | Pressure (bar) | Polymerization Tmax (in ° C.) | Degree of conversion (in %) |
|---|---|---|---|---|---|---|---|---|
| T08/E-VA/46 | 28 | | | | 130 | 2000 | 235 | 12.91 |
| T08/E-VA-MMA/1 | 27.6 | | 0.48 | | 130 | 2000 | 210 | 12.8 |

TABLE 1-continued

| Test ref. | VA | EIOM | MMA | 2EHA | Peroxide injected ppm weight | Pressure (bar) | Polymerization Tmax (in °C.) | Degree of conversion (in %) |
|---|---|---|---|---|---|---|---|---|
| T08/E-VA-MMA-EIOM/1 | 28.1 | 0.48 | 0.48 | | 131.5 | 2000 | 200 | 9.29 |
| T08/E-VA-MMA-EIOM/2 | 27.7 | 0.24 | 0.24 | | 128.2 | 2000 | 225 | 11.49 |
| T08/E-VA-MMA-EIOM/3 | 28.1 | 0.12 | 0.12 | | 132.5 | 2000 | 238 | 13.48 |
| T08/E-VA-2EHA-EIOM/1 | 28.13 | 0.48 | | 0.72 | 131.1 | 2000 | 205 | 10.85 | where
VA means: vinyl acetate monomer injected (% by weight)
EIOM means: ethylimidazolidone methacrylate monomer injected (% by weight)
MMA means: methyl methacrylate monomer injected (% by weight)
2EHA means: 2-ethylhexyl acrylate monomer injected (% by weight).

The characteristics of the products obtained are presented in table 2.

TABLE 2

| References | % by weight of VA NMR | % by weight of MMA NMR | % by weight of EIOM NMR | % by weight of 2EHA NMR | Melt Index 190° C. - 2.16 kg in g/10 min |
|---|---|---|---|---|---|
| T08/E-VA/46 | 26.9 | / | | | 406 |
| T08/E-VA-MMA/1 | 26.7 | 3.8 | | | 350 |
| T08/E-VA-MMA-EIOM/1 | 26.1 | 4.7 | 4 | | 230 |
| T08/E-VA-MMA-EIOM/2 | 26.2 | 1.8 | 1.3 | | 261 |
| T08/E-VA-MMA-EIOM/3 | 27.1 | 0.8 | 0.5 | | 387 |
| T08/E-VA-2EHA-EIOM/1 | 25.6 | | 4 | 4.6 | 265 |

EXAMPLE 2

Preparation of Hot-Melt Formulations

The hot-melt formulations prepared were as follows:
35% of one of the polymers, the synthesis of which is described in the preceding example;
50% of Escorez® 5600 resin (aliphatic resin, sold be Exxon);
15% of Sasolwax® H1 wax (Fischer-Tropsch wax, sold by Sasol).
The formulation is stabilized with 0.2% of an Irganox® 1010 antioxidant sold by Ciba-Geigy.
The formulation is produced by mixing the 3 components at a temperature of 170° C. for 30 min and then, under manual stirring (3 times) for a minimum of one hour.

EXAMPLE 3

Tests on Adhesion Between Glass and Aluminum

The hot-melt formulations described in example 2 were evaluated for the adhesion between glass and aluminum.

Films were prepared with the compositions described above by coating at 170° C., with a speed of the automatic applicator ("automatic film applicator" from Braive Instruments) set at 6 cm/s. The films are cooled in the ambient air.

Coating on an aluminum sheet with a thickness of 100 microns is subsequently carried out. The surface area is 225 cm$^2$ (15×15 cm$^2$) and the final weight per unit area is 35-38 g/m$^2$, i.e. 0.85 g for a surface area of 225 cm$^2$. Strips with a width of 25 mm are subsequently cut out using a strip cutter.

The HMA formulations comprising a polymer having units based on EIOM exhibit a "gel" appearance which, during coating, favors the deposition; there are fewer material strings than in the formulations using the EIOM free polymers. This point represents a first advantage common to the polymers which are subject matters of the invention.

Adhesive bonding to glass sheets with a thickness of 3 mm is subsequently carried out by compressing at 150° C. under 800 dN for 4 minutes. The products are subsequently cooled by being placed under a stainless steel plate surmounted by a weight of 5 kg, the entire assembly in ambient air. The final thickness of the adhesive joint is approximately 30 microns.

Peel tests are subsequently carried out at 90° C. using a Zwick tensile testing device. It is observed that all the formulations comprising a polymer according to the invention, in this case polymers comprising EIOM units, exhibit a peel strength comparable to and greater than that obtained for the reference copolymer devoid of EIOM.

This result is illustrated in the following table 3.

TABLE 3

| Hot-melt formulations comprising the following polymers | Adhesion (peel test at 90° C.) in N/25 mm | Standard deviation |
| --- | --- | --- |
| T08/E-VA/46 | 4.5 | 0.4 |
| T08/E-VA-MMA-EIOM/3 (0.5% EIOM) | 6.8 | 0.4 |
| T08/E-VA-MMA-EIOM/2 (1.3% EIOM) | 6.5 | 0.6 |
| T08/E-VA-MMA-EIOM/1 (4% EIOM) | 6.9 | 1.2 |
| T08/E-VA-2EHA-EIOM/1 (4% EIOM) | 6.8 | 1 |

Adhesive failure on the aluminum side is also observed for the EIOM-free products, whereas for the products comprising polymers with EIOM units, cohesive failure is observed, evidence of the better adhesive bonding contributed by the polymers comprising EIOM-based units. The polymers comprising EIOM-based units also exhibit better wetting of the glass, despite a higher viscosity. The product with MMA and without EIOM exhibits an even lower peel strength (not represented) than the E-VA/46 (reference polymer).

EXAMPLE 4

Hot-Melt Formulations Comprising the Copolymers of the Invention as Additives, and Tests on Adhesion Between Glass and Aluminum Formulations are prepared in the same way as those of example 2, except that the copolymers comprising EIOM-based units are no longer used as sole copolymer but as additive for a reference polymer (E-VA/46). The ratios of E-VA/46 to copolymer of the invention which are used in the formulations are presented in table 4 below (the overall content of copolymer is the same as that of example 2).

The adhesion tests carried out according to the procedure described in example 2 are carried out. The results appear in the same table 4.

TABLE 4

| Component 1 | % | Component 2 | % | Adhesion (peel test at 90° C.) in N/25 mm |
| --- | --- | --- | --- | --- |
| T08/E-VA/46 | 100 | | | 4.5 |
| T08/E-VA-MMA-EIOM/3 | 100 | | | 6.8 |
| T08/E-VA/46 | 75 | T08/E-VA-MMA-EIOM/2 (1.3% EIOM) | 25 | 8.6 |
| T08/E-VA/46 | 75 | T08/E-VA-MMA-EIOM/3 (0.5% EIOM) | 25 | 5.8 |
| T08/E-VA/46 | 75 | T08/E-VA-2EHA-EIOM/1 (4% EIOM) | 25 | 6 |

It is observed that, even as an additive, the copolymers of the invention improve the adhesion including for very low overall contents of EIOM in the formulations.

EXAMPLE 5

Study on the Bonding Time

The bonding time is defined as the difference between the open assembly time T0 and the setting time TS; the greater this time, the greater the flexibility in industrial application.

The following techniques are used to measure these times:

for the measurement of the setting time, the open assembly time is set at 0.6 s: the measurement is validated when 90% defibration is obtained for at least 3 boards out of 5 (this test is carried out on 5 test specimens).

For the measurement of the open assembly time, the closed time is set at 10 s and the open assembly time corresponds to the maximum time at which 90% defibration is still observed for at least 3 tests out of 5.

These measures are carried out on an Olinger device.

The times measured for the formulations of example 4, and for a formulation of example 2 are presented in table 5 below. It may be observed that the use of the copolymer of the invention, whether as sole copolymer or as additive for the reference polymer, makes it possible to significantly increase the bonding time.

TABLE 5

| Component 1 | % | Component 2 | % | Open assembly time (s) | Setting time (s) |
| --- | --- | --- | --- | --- | --- |
| E-VA/46 | 100 | | | 14 | 9 |
| T08/E-VA-MMA-EIOM/3 | 100 | | | 16 | 4 |
| T08/E-VA/46 | 75 | T08/E-VA-MMA-EIOM/2 (1.3% EIOM) | 25 | 15 | 4 |
| T08/E-VA/46 | 75 | T08/E-VA-MMA-EIOM/3 (0.5% EIOM) | 25 | 15 | 4 |
| T08/E-VA/46 | 75 | T08/E-VA-2EHA-EIOM/1 (4% EIOM) | 25 | 15 | 5 |

EXAMPLE 6

Tests on Elongation at Break of a Copolymer of the Invention

A creep test is carried out in a DMA Q800 from TA Instruments at 60° C., a tensile stress of 0.01 MPa being applied.

E-VA/46, E-VA-MMA/1 and E-VA-MMA-EIOM/1, the syntheses of which are described in example 1, are studied according to this method. The results are presented in table 6.

It is found that the polymer carrying associative groups (E-VA-MMA-EIOM/1) can undergo greater deformations without breaking. The product with EIOM creeps as slowly as the identical one without EIOM (E-VA-MMA/1).

TABLE 6

The dimensions of the test specimens tested are: 10 × 4 × 3.5 mm.

| | Elongation at break (%) | Time (min) |
| --- | --- | --- |
| T08/E-VA-MMA/1 | 10 | 20 |
| T08/E-VA-MMA-EIOM/1 | >17 (no breaking before the end of the test) | 190 |
| T08/E-VA/46 | 6 | 20 |

EXAMPLE 7

Hot-Melt Formulations Comprising the Copolymers of the Invention as Additives, and Tests on Adhesion to PET A copolymer is prepared according to the method of preparation of the polymer T08/E-VA-MMA-EIOM/3 from example 1. The final content of EIOM obtained is determined at 0.6% by NMR. A hot-melt formulation is subsequently prepared with this copolymer according to the procedure described in example 2.

This hot-melt formulation is subsequently coated onto a surface area of 15×15 cm² of PET with a thickness of 15 μm. The film deposited on the surface has a weight of 1 gram. The assembled product is compressed at 140° C. under 800 dN for 2 minutes, then placed under a stainless steel plate covered with a weight of 5 kg and cooled using a stream of air.

The coated structure is covered with the same PET sheet with a thickness of 50 μm; the method of compressing and cooling is the same as that described above in example 3. The final thickness of the hot-melt joint is 40-45 μm.

Strips with a width of 25 mm are subsequently cut out from this sandwich structure.

Equivalent structures are prepared with hot-melt formulations based on the copolymers T08/E-VA/46 and T08/E-VA-MMA/1 of example 1.

The adhesion between the two PET strips of these 3 series of samples was subsequently evaluated using a Zwick® dynamometer according to a method developed for peeling operations on flexible structures: the peeling is carried out with an angle of 180° between the PET strips.

The test gives the results presented in the following table 7:

TABLE 7

| Structure based on the copolymer | T08/E-VA/46 | T08/E-VA-MMA/1 | T08/E-VA-MMA-EIOM/3 |
|---|---|---|---|
| Peel strength (N/25 mm) | 0.2 | 0.2 | 0.4 |

It is found that the use of the copolymer according to the invention makes it possible to achieve much higher bonding strengths on PET.

The invention claimed is:

1. A hot-melt adhesive comprising a polymer and at least one tackifying resin, wherein the polymer comprises units resulting from ethylene and a monomer carrying associative groups, said monomer carrying associative groups comprising:
   (i) a reactive group capable of polymerization, wherein the reactive group is selected from the group consisting of (meth)acrylate, N-monosubstituted (meth)acrylamide, N,N-disubstituted (meth)acrylamide, vinyl, allyl, and styryl groups; and
   (ii) an associative group comprising a nitrogenous heterocycle; said monomer carrying associative groups corresponding to the formula (1):

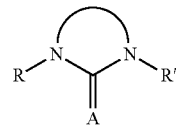

(1)

where:
R is T-(G)$_n$- in which T is a reactive group capable of polymerization, wherein the reactive group is selected from the group consisting of (meth)acrylate, N-monosubstituted (meth)acrylamide, N,N-disubstituted (meth)acrylamide, vinyl, allyl, and styryl groups, n has the value 0 or 1 and G is a linear or branched $C_1$-$C_{24}$ alkylene chain optionally interrupted by one or more nitrogen atoms,
R' is a hydrogen atom, and
A is an oxygen or sulfur atom.

2. The hot-melt adhesive as claimed in claim 1, wherein the associative group is selected from the group consisting of imidazolidonyl, triazolyl, triazinyl, bisureyl, and ureido-pyrimidyl group.

3. The hot-melt adhesive as claimed in claim 1, wherein the associative monomers are selected from the group consisting of ethylimidazolidone methacrylate and ethylimidazolidone methacrylamide.

4. The hot-melt adhesive as claimed in claim 1, and further comprising unsaturated carboxylic acid or unsaturated carboxylic acid derivative monomers.

5. The hot-melt adhesive as claimed in claim 1, and further comprising vinyl ester monomers.

6. The hot-melt adhesive as claimed in claim 1, and further comprising maleic anhydride and/or unsaturated epoxide monomers.

7. The hot-melt adhesive as claimed in claim 1, and further comprising an additive which is a plasticizer, a filler, a stabilizer or a mixture thereof.

8. A process for the preparation of the hot-melt adhesive according to claim 1, which comprises making the polymer by high-pressure radical copolymerization, which comprises introducing ethylene, the monomer carrying associative groups and a polymerization initiator into a tubular reactor at a pressure of between 1000 and 3000 bar, at a temperature of between 80 and 325° C., the amount of monomers carrying associative groups which are introduced ranging up to 20% by weight, with respect to the total weight of the mixture of ethylene and monomer carrying associative groups which are introduced.

9. A method of making the hot-melt adhesive according to claim 1, which comprises adding the polymer to the composition comprising at least one tackifying resin.

10. The hot-melt adhesive as claimed in claim 1, wherein G is a linear or branched $C_1$-$C_{10}$ alkylene chain optionally interrupted by one or more nitrogen atoms.

11. The hot-melt adhesive as claimed in claim 1, wherein G is a linear $C_1$-$C_6$ alkylene chain.

12. The hot-melt adhesive as claimed in claim 1, wherein A is an oxygen atom.

13. The hot-melt adhesive as claimed in claim 2, wherein the associative group is an imidazolidonyl group.

* * * * *